(12) United States Patent
Ah-Pine

(10) Patent No.: US 8,150,793 B2
(45) Date of Patent: Apr. 3, 2012

(54) DATA FUSION USING CONSENSUS AGGREGATION FUNCTIONS

(75) Inventor: Julien Ah-Pine, La Tronche (FR)

(73) Assignee: Xerox Corporation, Norwalk, CT (US)

( * ) Notice: Subject to any disclaimer, the term of this patent is extended or adjusted under 35 U.S.C. 154(b) by 832 days.

(21) Appl. No.: 12/168,436

(22) Filed: Jul. 7, 2008

(65) Prior Publication Data

US 2010/0005050 A1 Jan. 7, 2010

(51) Int. Cl.
G06F 17/00 (2006.01)
G06N 5/02 (2006.01)
(52) U.S. Cl. ........................................................ 706/50
(58) Field of Classification Search ...................... 706/50
See application file for complete search history.

(56) References Cited

U.S. PATENT DOCUMENTS 6,976,207 B1 * 12/2005 Rujan et al. .................... 715/234
2003/0037074 A1 * 2/2003 Dwork et al. .................. 707/500

OTHER PUBLICATIONS

Klement, Erich, Radko Mesiar, and Endre Pap "Triangular Norms. Position Paper I: Basic analytical and algebraic properties" Fuzy sets and Systems 143 2004. p. 5-26 [Online] Downloaded Mar. 9, 2011. http://www.sciencedirect.com/science?_ob=MImg&_imagekey=B6V05-4B3JN67-6-K&_cdi=5637&_user=2502287&_pii=S0165011403004950&_origin=gateway&_coverDate=04%2F0.*

Nikravesh, M and B Zvine. "Fuzzy Queries, search, and decision support system" Soft Computing 6 2002 p. 373-399. [Online] Downloaded Mar. 9, 2011. http://www.springerlink.com/content/q0bjya302pua9j71/fulltext.pdf.*

Batyrshin et al., "Fuzzy Modeling Based on Generalized Conjunction Operations," IEEE Transactions on fuzzy systems, 10(5), 2002.
C. Jordan, "Problemes de la probabilite des epreuves repetees dans le cas general," Bulletin De La S.M.F., 67:223-242, English Abstract, 1939.
Dwork et al., "Rank Aggregation Methods for the Web," in WWW, pp. 613-622, 2001.
Dwork et al., "Rank Aggregation Revisited," Presented in conference proceeding, 2001.
J.H. Lee, "Analyses of Multiple Evidence Combination,"SIGIR Forum, 31 (SI):267-276, 1997.
Tie-Yan Liu et al., "LETOR: Benchmark Dataset for Research on Learning to Rank for Information Retrieval," in LR4IR 2007 in conjunction with SIGIR 2007, 2007.
Klementiev et al., "An Unsupervised Learning Algorithm for Rank Aggregation," In Proceedings of the European Conference on Machine Learning (ECML), Sep. 2007.

(Continued)

Primary Examiner — Kakali Chaki
Assistant Examiner — Ben Rifkin
(74) Attorney, Agent, or Firm — Fay Sharpe LLP

(57) ABSTRACT

A fusion system fuses M rankings generated by M judges by (i) computing values of an aggregation function for items of the M rankings, the aggregation function including a sum of pairwise conjunctions of ranking values of different judges for an input item, and (ii) constructing an aggregation ranking based on the aggregation function values. In an illustrative application, the judges are different Internet search engines and the rankings are sets of search engine results generated for a query input to the search engines, and a consensus search result corresponding to the query is defined by the aggregation ranking. In another illustrative application, the judges are different soft classifiers, and the rankings are probability vectors generated for an input object by the different soft classifiers, and the input object is classified based on a consensus probability vector defined by the aggregation ranking.

15 Claims, 3 Drawing Sheets

OTHER PUBLICATIONS

Lillis et al., "ProbFuse: A Probabilistic Approach to data Fusion," SIGIR '06 Seattle, Washington, pp. 139-146, 2006.

Wu et al., "Regression Relevance Models for Data Fusion," IEEE, pp. 264-268, 2007.

Zheng et al., "A Regression Framework for Learning Ranking Functions Using Relative Relevance Judgments," SIGIR '07, Amsterdam, The Netherlands, pp. 287-294, 2007.

Farah et al., "An Outranking Approach for Rank Aggregation in Information Retrieval," SIGIR '07, Amsterdam, The Netherlands, pp. 591-598, 2007.

Renda et al., "Web Metasearch: Rank vs. Score Based Rank Aggregation Methods," SAC2003, Melbourne, Florida, 2003.

Wu et al., "Data Fusion with Correlation Weights," University of Ulster, Northern Ireland, UK, ECIR 2005, LNCS 3408, pp. 275-286, 2005.

Vogt et al., "Fusion Via a Linear Combination of Scores," Kluwer Academic Publishers, 1998.

Rudas et al., "Information Aggregation in Intelligent Systems Using Generalized Operators," International Journal of Computers, Communications & Control, vol. 1, No. 1, pp. 47-57, 2006.

Fagin et al., "Comparing and Aggregating Rankings with Ties," PODS 2004, Paris, France, pp. 47-58, 2004.

Dubois et al., "On the Use of Aggregation Operations in Information Fusion Processes, " Elsevier B.V., Fuzzy Sets and Systems 142, pp. 143-161, 2004.

Cao et al., "Learning to Rank: From Pairwise Approach to Listwise Approach," Proceedings of the 24th International Conference on Machine Learning, Corvallis, OR, 2007.

N. Ailon, "Aggregation of Partial Rankins, p-Ratings and Top-m Lists," Institute for Advanced Study, Princeton, NJ, pp. 415-424, 2007.

* cited by examiner

DATA FUSION USING CONSENSUS AGGREGATION FUNCTIONS

BACKGROUND

The following relates to the informational arts, computer arts, and related arts. Some illustrative applications of the following include meta-search engines, meta-classifiers, meta-prioritizers, and so forth.

In the informational arts, a common operation relates to scoring items based on a scoring criterion. For example, an Internet search engine receives a scoring criterion in the form of a search query, and outputs a list of relevant web sites coupled with relevance rankings or scores, where the relevance ranking or score assigned to each web site reflects the search engine's assessment of the relevance of that web site to the search query. In a simple embodiment, the relevance ranking or score may be a count of the number of occurrences of terms of the search query in the content of the web site. More complex relevance scoring or ranking may take into account other factors such as where the search terms occur (for example, search terms in the title of the web site may be weighted more strongly than search terms in body text), the popularity of the web site (measured, for example, based on a count of "hits" or downloads of the web site), or whether the web site is a "favored" web site (for example, a web site that has contracted with the search engine operator to obtain more favorable relevance rankings). In general, different search engines may use different bases for computing the relevance.

Other examples of scoring items based on a scoring criterion include: soft classification in which a classifier assigns an object a probability or other measure of membership in a particular class; or service job prioritization in which a service center receives service jobs and a scheduler ranks the jobs in order of importance based on a suitable prioritization criterion.

Each such application can be generally described as having a judge (e.g., the search engine, or the classifier, or the scheduler) that assigns a score (relevance ranking, or soft classification probability, or job priority) to items (web sites, or classes of a set of classes, or service jobs) based on a scoring criterion or algorithm (a search query processed by the search engine's relevance ranking basis, or an input object processed by a classifier algorithm, or a service job input to a scheduling algorithm). The obtained result is dependent upon the scoring criterion used by the judge, and in general different judges may use different scoring criteria and hence generate different rankings.

It is known to aggregate the rankings from different judges to produce a consensus aggregation. For example, meta-search engines have been deployed which input a received query to different Internet search engines, collect the rankings from the different Internet search engines, and apply an aggregation algorithm to generate a consensus ranking. Some Internet users find that meta-search engines provide better results than any individual search engine operating alone. Similarly, "meta-classifiers" combine classification results from different classifiers to generate a consensus classification.

In such consensus aggregation, an aggregation function is applied to generate consensus scores for the items based on the scores assigned by the constituent judges. The consensus ranking is dependent upon the choice of aggregation function. For example, a simple aggregation function is an average, in which the scores generated by the different judges for each item are averaged together to generate the aggregated score for that item. A disadvantage of this approach is that it can produce a high aggregated score for an item on which the judges have little consensus. For example, an item for which half the judges rank near the top of the ranking and half the judges rank near the bottom of the ranking will end up near the middle of the aggregated ranking. However, that is not reflective the consensus of the judges.

Some more complex aggregation functions weight the average score of an item by the number of judges that rank the item above a threshold (for example, the number of judges that rank the item in the "top ten"). These approaches are deemed to improve the aggregated rankings. However, the basis for this modification of the aggregation function is not readily apparent, and the approach can overemphasize a generally high ranking (e.g., in the "top ten") compared with the actual scores assigned by the various judges. These aggregation functions also do not recognize or take into account relationships which may or may not exist between different judges, and are not tunable to accommodate different relationships between judges. For example, consensus between two judges that use wholly independent ranking criteria may be of substantial significance; whereas, consensus between two judges that use highly correlated ranking criteria may be of little significance.

BRIEF DESCRIPTION

In some illustrative embodiments disclosed as illustrative examples herein, a fusion method is disclosed for fusing M rankings generated by M judges where M is an integer greater than unity, the fusion method comprising: computing values of an aggregation function for items in a union of items of the M rankings, the aggregation function including a sum of pairwise conjunctions of ranking values of different judges for an input item; constructing an aggregation ranking of items in the union of items of the M rankings based on the computed values of the aggregation function; and outputting informational content embodying the aggregation ranking.

In some illustrative embodiments disclosed as illustrative examples herein, a storage medium is disclosed, which stores instructions executable to fuse M rankings generated by M judges where M is an integer greater than unity by (i) computing values of an aggregation function for items of the M rankings, the aggregation function including a sum of pairwise conjunctions of ranking values of different judges for an input item and (ii) constructing an aggregation ranking of items of the M rankings based on the computed values of the aggregation function.

In some illustrative embodiments disclosed as illustrative examples herein, a fusion apparatus is disclosed for fusing M rankings generated by M judges where M is an integer greater than unity, the fusion apparatus comprising a digital processing device configured to (i) compute values of an aggregation function for items of the M rankings, the aggregation function including a sum of pairwise conjunctions of ranking values of different judges for an input item and (ii) construct an aggregation ranking of items of the M rankings based on the computed values of the aggregation function.

DETAILED DESCRIPTION

Figure 1:
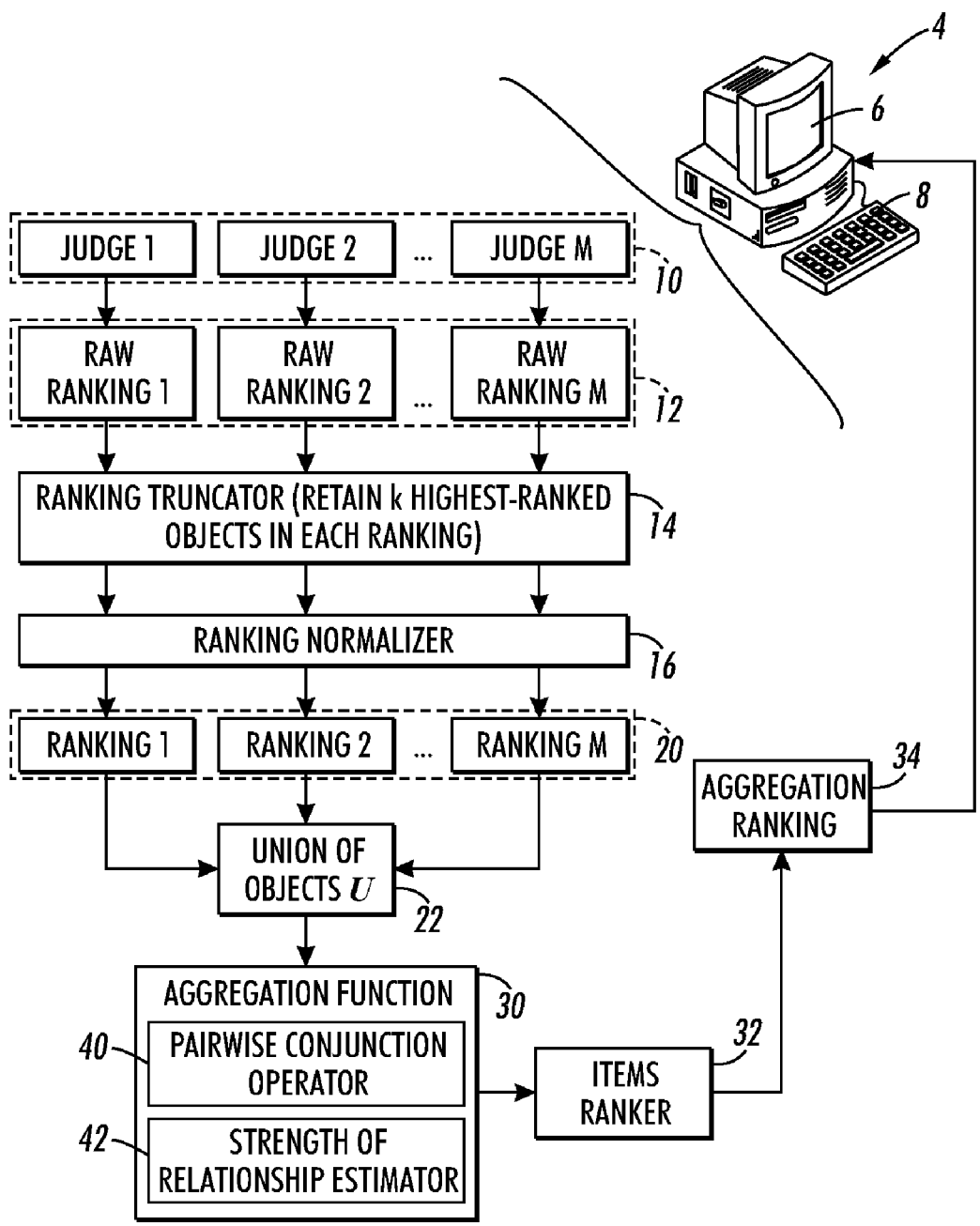
FIG. 1 diagrammatically shows a fusion apparatus for fusing M rankings generated by M judges where M is an integer greater than unity.

With reference to FIG. 1, a fusion apparatus is illustrated. The fusion apparatus is suitably embodied by a digital processing device 4, such as a computer (illustrated), or a personal data assistant (PDA), cellular telephone or other handheld device, or so forth. In some embodiments the digital processing device is Internet-based, for example embodied as an Internet server accessible via the Internet or an organizational server accessible via an organizational digital network. The fusion apparatus optionally also includes one or more output devices 6, such as a display (illustrated), a printer or other marking engine, a voice synthesizer, or so forth. The fusion apparatus optionally also includes one or more user input devices 8, such as a keyboard (illustrated), or a mouse, trackball, or other pointing-type input device, or so forth. The illustrated input and output devices 6, 8 suitably define a user interface. In the illustrated embodiment, the unitary computer 4 includes the input and output devices 6, 8 such that the processing device and the user interface device are integrated together. Alternatively, they may be separate—for example, the user interface device may be embodied as a laptop computer while the processing device performing the fusion operations is embodied as a remote Internet-based server system. The fusion system may also be embodied as a storage medium storing instructions executable to perform the disclosed fusion operations. For example, the storage medium may be a magnetic disk or tape, an optical disk or tape, an electrostatic memory, a random access memory (RAM), a read-only memory (ROM), a remote Internet server storage device, or so forth, and the stored instructions may be executable on one or more of the described digital processing devices such as a computer, PDA, cellular telephone, Internet server, or so forth.

The fusion apparatus communicates with M judges 10, where M is an integer greater than unity, to receive M raw rankings 12. For example, the judges 10 may be different Internet search engines and the raw rankings 12 may be search results generated by the search engines responsive to a query. In other applications, the judges 10 may be different soft classifiers each of which is configured to receive an input object and to output a probability vector of length or dimension k where the values of the k elements provide membership probabilities for the input object in each of k classes of a set of k classes. In general, each judge generates its ranking using its own criterion or criteria, which may be wholly different from the criterion or criteria used by other judges, or which may partially or wholly overlap the criterion or criteria used by one or more other judges. As a consequence, the M raw rankings 12 are generally different, although a given item may be ranked highly or at the same ranking value in two or more of the M raw rankings 12. For example, if the M judges are different Internet search engines and they receive a query "George Washington", it may not be surprising that some, many, or all of the M Internet search engines may rank a site entitled "The life and times of George Washington" that is maintained by a respected historical organization near the top of their respective raw rankings 12. On the other hand, the rankings will differ to the extent that different criteria are used by different judges. To use the same example, if the site entitled "The life and times of George Washington" is a scholarly site that is infrequently visited except by a small and select group of scholars, then an Internet search engine that strongly emphasizes number of visits in its ranking criterion may rank this site rather low, whereas another search engines that place less emphasis on number of visits may rank the site substantially higher.

Depending upon the nature of the raw rankings 12, some preprocessing may optionally be performed in order to convert the raw rankings 12 into a format more amenable to aggregation. For example, a ranking truncator 14 may truncate each of the raw rankings 12 so as to retain only the top k results. Keeping with the search engines example, a given search engine may report dozens, hundreds, thousands, or more results, and in such a case the rankings truncator 14 may retain, for example, the top k=10 results in each raw ranking 12. On the other hand, if the judges are different classifiers each of which is trained to perform soft classification of objects respective to a set of C classes, then the raw rankings are suitably probability vectors each having precisely C elements whose values are indicative of membership probability in the corresponding C classes. In this case, truncation is optionally omitted (in which case k=C), or truncation may be performed to reduce the size of the rankings to a value k that is smaller than C. In the following, it is assumed that either: (i) the truncator 14 ensures that the truncated rankings each include k items; or (ii) the raw rankings 12 inherently each have k items. However, this assumption is only for convenience, and the described fusion techniques can also be applied to fuse rankings having different numbers of items.

The following notation is used herein. The set of all ranked items that are ranked in the top k by at least one of the M judges 10 is denoted as the set U, which is the union of the rankings (after truncation, if performed). The size of the set U is K, where $K \geq k$ holds. The condition K=k holds if every one of the rankings (after truncation if performed) contains the same k items (albeit possibly in different orders). The condition K>k holds if some items are ranked in one or more rankings but not in one or more other rankings (again, after truncation if performed). The rankings 12 are denoted by the notation $L_k(j)$ where k denotes the ranking either inherently includes k items or has been truncated to include only the top k items, and j indexes the $j^{th}$ judge.

As a further preprocessing consideration, different judges, such as different Internet search engines, may use different scales in ranking results. For example one search engine may rank a result on a scale of one-to-five stars, whereas another search engine may rank a result on a scale of 0-100%. Accordingly, in such applications a ranking normalizer 16 operates to normalize the rankings to a common ranking scale. A suitable normalization is the score normalization, which is suitably implemented as follows. Defining $V_j(i)$ as the unnormalized ranking value assigned by the $j^{th}$ judge to the $i^{th}$ item of the set of set of ranked items U, the normalized ranking value $S_j(i)$ is:

$$S_j(i) = \frac{V_j(i) - \min_{i'}\{V_j(i')\}}{\max_{i'}\{V_j(i')\} - \min_{i'}\{V_j(i')\}} \quad (1)$$

$$\forall j = 1, \ldots, M; \quad \forall i \in L_k(j),$$

for items that are included in the ranking $L_k(j)$, and:

$$S_j(i) = 0 \, \forall j = 1, \ldots, M; \forall i \in (U - L_k(j)) \quad (2),$$

for items that are not included in the ranking $L_k(j)$. Equation (1) ensures that the ranked values $S_j(i)$ lie in the interval [0,1] for items that are included in the ranking $L_k(j)$, and Equation (2) ensures that $S_j(i)=0$ for items that are not included in the ranking $L_k(j)$ (but which are ranked in at least one other ranking $L_k(j')$ where $j' \neq j$, and hence are members of the set of ranked items U).

The rankings after appropriate preprocessing such as truncation and/or normalization are shown in FIG. 1 as the set of M rankings 20. The union of these M rankings 20 is the set of ranked items U 22, which includes K items. The rankings 20 have values suitably denoted as $S_j(i)$ for the $i^{th}$ item (in the list of ranked items U 22), where any item that does not appear in the $j^{th}$ ranking (and hence is deemed "not relevant" by judge j) is assigned a value $S_j(i)=0$ by operation of Equation (2).

The M rankings 20 and the set of ranked items U 22 serve as input to an aggregation function 30 that is used by an items ranker 32 to generate a consensus or aggregation ranking 34 of the set of ranked items U 22. In a suitable embodiment, the aggregation function 30 operates as follows. The parameter $S_j(i)$ as used herein denotes an event in which the $j^{th}$ judge considers the $i^{th}$ item to be relevant, that is, included in the ranking $L_k(j)$. The normalized score $S_j(i)$ has a value in the range [0,1], and can be treated as a truth value of event $S_j(i)$. The parameter $E_m^M(i)$ herein denotes an event in which at least m judges consider the $i^{th}$ item to be relevant, that is, in which the $i^{th}$ item is included in at least m of the rankings $L_k(i)$, $j=1, \ldots, M$. The event $E_m^M(i)$ is given by:

$$E_m^M = \bigcup_{1 \leq j_1 < j_2 < \ldots < j_m \leq M} (\bigcap (S_{j_1}(i), S_{j_2}(i), \ldots, S_{j_m}(i))) \quad (3)$$

$$\forall m = 1, \ldots, M; \quad \forall i = 1, \ldots, K.$$

The truth value of event $E_m^M(i)$ is denoted herein as $E_m^M(i)$. This is a combinatorial problem which generalizes Poincaré's formula also known as the inclusion-exclusion principle. It can be shown that the combinatorial computation of $E_m^M(i)$ can be expressed as a linear combination of the following quantities, $\forall i=1, \ldots, K$:

$$S_l^M(i) = \quad (4)$$

$$\begin{cases} \sum_{j=1}^{M} S_j(i) & \text{for } l = 1 \\ \sum_{1 \leq j_1 < j_2 < \ldots < j_l \leq M} (T(S_{j_1}(i), S_{j_2}(i), \ldots, S_{j_l}(i))) & \text{for } l = 2, \ldots, M \end{cases}$$

where T is in some embodiments a triangular norm, and more generally is a conjunction operation.

Triangular norms are logical operations which, given two events A and B with truth values $\mu(A)$ and $\mu(B)$ both in the range [0, 1], give a truth value, also in the range [0, 1], of the conjunction $A \cap B$. Triangular norms are also sometimes called t-norms, and are special functions from $[0, 1] \times [0, 1]$ to $[0, 1]$ which exhibit certain characteristics such as being commutative, associative, and monotonic.

The linear combination of Equation (4) is related to Jordan's combinatorial formulas, and can be written as:

$$E_m^M(i) = \sum_{l=m}^{M} (-1)^{l-m} \binom{l-1}{m-1} S_l^M(i) \quad (5)$$

$$\forall m = 1, \ldots, M; \quad \forall i = 1, \ldots, K$$

where expressions of the form:

$$\binom{n}{p} = \frac{n!}{p!(n-p)!} \quad (6)$$

are binomial coefficients. Equation (5) can be further rewritten as:

$$E_m^M(i) = \sum_{l=m}^{M} \binom{-m}{l-m} S_l^M(i) \quad (7)$$

$$\forall m = 1, \ldots, M; \quad \forall i = 1, \ldots, K$$

where expressions of the form:

$$\binom{-n}{p} = (-1)^p \binom{n+p-1}{p} = \frac{(-n)(-n-1)\ldots(-n-p+1)}{p!} \quad (8)$$

are negative binomial coefficients.

The truth values $E_m^M(i)$; $m=1, \ldots, M$ can be viewed as consensus measures indicative of the consensus amongst the M judges that the $i^{th}$ item should be ranked as relevant. A consensus aggregation function A(i) is constructed from these consensus measures $E_m^M(i)$; $m=1, \ldots, M$ as follows:

$$A(i) = \sum_{m=1}^{M} m E_m^M(i) \quad \forall i = 1, \ldots, K. \quad (9)$$

It is desired that the $i^{th}$ item should have a higher aggregation score as the number of judges that find the $i^{th}$ item to be relevant increases. In accordance with this desire, the aggregation function of Equation (9) weighs by m the consensus measure $E_m^M(i)$ that item i is relevant for at least m judges, and takes a sum of these weighted values over m from 1 to M. This approach gives increasing weights with increasing value of m, that is, with increasing number of judges who consider item i to be relevant.

The computational cost of Equation (9) is relatively high. Computation of $S_l^M(i)$ in Equation (4) entails enumeration of $$\binom{M}{l}$$

combinations which grows exponentially. However, it can be shown that Equation (9) can be rewritten as:

$$A(i) = \sum_{j=1}^{M} S_j(i) + \sum_{1 \leq j < j' \leq M} T(S_j(i), S_{j'}(i)) \quad (10)$$

which has substantially lower computational cost of order $O(M^2)$. In Equation (10), $T(\ldots)$ denotes a pairwise conjunction operator 40. In some embodiments described herein, $T(\ldots)$ denotes a triangular norm conjunction operator.

In some suitable embodiments, the pairwise conjunction operator T(. . .) 40 is a non-parametric triangular norm, such as for example: a minimum triangular norm $T^M$ given by:

$$T^M(S_j(i), S_{j'}(i)) = \min(S_j(i), S_{j'}(i)) \quad (11);$$

a product triangular norm $T^P$ given by:

$$T^P(S_j(i), S_{j'}(i)) = (S_j(i) \bullet S_{j'}(i)) \text{ where } \bullet \text{ denotes a product} \quad (12);$$

a Lukasiewicz triangular norm $T^L$ given by:

$$T^L(S_j(i), S_{j'}(i)) = \max(S_j(i) + S_{j'}(i) - 1, 0) \quad (13);$$

or a drastic product triangular norm $T^D$ given by:

$$T^D(S_j(i), S_{j'}(i)) = \begin{cases} 0 & \text{if } (S_j(i), S_{j'}(i)) \in [0,1]^2 \\ \min(S_j(i), S_{j'}(i)) & \text{otherwise} \end{cases} \quad (14)$$

Employing a product triangular norm $T^P$ for the pairwise conjunction of ranking values of different judges has the effect of assuming that the pair of judges are independent, that is, have a low or zero strength of relationship. On the other hand, employing a minimum triangular norm $T^M$ for the pairwise conjunction of ranking values of different judges has the effect of assuming that the pair of judges are highly correlated, that is, have a high strength of relationship. In probability theory, $T^M$ and $T^L$ are respectively upper and lower bounds for copulas. They are called Fréchet-Hoeffding boundaries. In triangular norms theory, $T^M$ is the upper bound of triangular norms but $T^D$ is the one which is the lower bound. That is:

$$T^D(\mu(A), \mu(B)) \leq T(\mu(A), \mu(B)) \leq T^M(\mu(A), \mu(B)) \; \forall T(\ldots) \text{ is a triangular norm}; \; \forall (\mu(A), \mu(B)) \in [0,1]^2 \quad (15)$$

As $T^M$ is the upper bound of triangular norms, this means that it gives the highest conjunction measure between two judges. It can be shown that by using $T^M$ as the relationship type between two judges j, j', it follows that either $S_j(i) \subset S_{j'}(i)$ or $S_{j'}(i) \subset S_j(i)$. On the other hand, as $T^D$ is the lower bound of triangular norms, it typically yields a low or zero value when used as the pairwise conjunction.

Using non-parametric t-norms for the pairwise conjunctions can reduce the computation time. For example, the following factorization property holds:

$$\sum_{1 \leq j < j' \leq M} T^P(S_j(i), S_{j'}(i)) = \frac{1}{2}\left(\left(\sum_{j=1}^{M} S_j(i)\right)^2 - \sum_{j=1}^{M} (S_j(i))^2\right) \quad (16)$$

which leads to O(M) computation cost when using the product triangular norm $T^P$. The computational cost when using the minimum triangular norm $T^M$ can be reduced to O(M log(M)) by using the following:

$$\sum_{1 \leq j < j' \leq M} T^M(S_j(i), S_{j'}(i)) = \sum_{j=1}^{M} (M-j) S_j^*(i) \quad (17)$$

where $S_1^*(i) \leq S_2^*(i) \leq \ldots \leq S_M^*(i)$.

In some suitable embodiments, the pairwise conjunction operator T(. . .) 40 of Equation (10) is a parametric triangular norm, such as for example: a Schweizer-Sklar parametric triangular norm defined for the parameter range $\forall \lambda \in [-\infty, \infty]$ and given by $$T_\lambda^{SS}(\mu(A), \mu(B)) = \begin{cases} T^M(\mu(A), \mu(B)) & \text{if } \lambda = -\infty \\ T^P(\mu(A), \mu(B)) & \text{if } \lambda = 0 \\ T^D(\mu(A), \mu(B)) & \text{if } \lambda = \infty \\ (\max(\mu(A)^\lambda + \mu(B)^\lambda - 1, 0))^{\frac{1}{\lambda}} & \text{otherwise} \end{cases} \quad (18)$$

a Frank triangular norm defined for the parameter range $\forall \lambda \in [0, \infty]$ and given by $$T_\lambda^F(\mu(A), \mu(B)) = \begin{cases} T^M(\mu(A), \mu(B)) & \text{if } \lambda = 0 \\ T^P(\mu(A), \mu(B)) & \text{if } \lambda = 1 \\ T^L(\mu(A), \mu(B)) & \text{if } \lambda = \infty \\ \log_\lambda\left(1 + \frac{(\lambda^{\mu(A)} - 1)(\lambda^{\mu(B)} - 1)}{\lambda - 1}\right) & \text{otherwise} \end{cases} \quad (19)$$

or an Aczél-Alsina triangular norm defined for the parameter range $\forall \lambda \in [0, \infty]$ and given by $$T_\lambda^{AA}(\mu(A), \mu(B)) = \begin{cases} T^D(\mu(A), \mu(B)) & \text{if } \lambda = 0 \\ T^M(\mu(A), \mu(B)) & \text{if } \lambda = \infty \\ \exp\left(-((-\log\mu(A))^\lambda + (-\log\mu(B))^\lambda)^{1/\lambda}\right) & \text{otherwise} \end{cases} \quad (20)$$

These parametric triangular norms reduce to one of the non-parametric triangular norms of Equations (11)-(14) for certain values of the parameter $\lambda$. For example, $T_{\lambda=0}^{AA}(\mu(A), \mu(B)) = T^D(\mu(A), \mu(B))$ for $\lambda = 0$.

The aggregation function A(i) as written in Equation (10) expresses A(i) in terms of pairwise conjunctions between judges. This optionally enables specification of different types of the relationships between different pairs of judges by using different fuzzy conjunction operations. For example, the choice of fuzzy conjunction operation can be made to reflect a strength of relationship between the pair of judges. When using a parametric triangular norm such as one of the illustrative parametric triangular norms of Equations (18)-(20), this can be achieved by having a strength of relationship estimator 42 estimate strengths of relationship for different pairs of ranking values obtained from the M rankings, and adjusting a parameter of the parametric triangular norm ($\lambda$, in the illustrative examples of Equations (18)-(20)) for different pairwise conjunctions of ranking values based on the estimated strengths of relationship of the different pairs of ranking values.

For example, when using parametric copulas such as $T_\lambda^{AA}$, the adjustment entails providing different pairwise parameters $\lambda_{jj'}; \forall j < j'$ to reflect the different strengths of relationships between different pairs of judges. As the parameters $\lambda_{jj'}$ give the strength of the relationship between judges j and j', these values are optionally computed using Kendall correlation measures. In that configuration, each $S_j; j=1, \ldots, M$ is interpreted as a random variable and for a pair of judges j, j' their different profiles are compared by computing their Kendall correlation measure given by:

$$\tau(S_j, S_{j'}) = \frac{\text{Conc}(S_j, S_{j'}) - \text{Disc}(S_j, S_{j'})}{\sqrt{\left(\frac{N(N-1)}{2} - \text{Tie}(S_j)\right)\left(\frac{N(N-1)}{2} - \text{Tie}(S_{j'})\right)}} \quad (21)$$

-continued where:

$$Conc(S_j, S_{j'}) = \#\{(i, i'), i < i' : \{S_j(i) < S_j(i') \cap S_{j'}(i) < S_{j'}(i')\} \cup \{S_j(i) > S_j(i') \cap S_{j'}(i) > S_{j'}(i')\}\}, \quad (22)$$

$$Disc(S_j, S_{j'}) = \#\{(i, i'), i < i' : \{S_j(i) < S_j(i') \cap S_{j'}(i) > S_{j'}(i')\} \cup \{S_j(i) > S_j(i') \cap S_{j'}(i) < S_{j'}(i')\}\}, \quad (23)$$

and $$Tie(S_j, S_{j'}) = \#\{(i, i'), i < i' : \{S_j(i) = S_j(i')\}\}. \quad (24)$$

In probability theory, a copula is a function that takes as inputs the marginal distribution of two random variables and gives as output their joint distribution. A copula characterizes the dependence type between two random variables. In that context, for some parametric copulas a link function exists that allows computation of the parameter $\lambda_{jj'}$ from the Kendall correlation measure $\tau(S_j, S_{j'})$. As an illustrative example, the strength of relationship estimator 42 suitably computes the following link function for the Aczél-Alsina triangular norms $T_\lambda^{AA}$ of Equation (20):

$$\lambda_{jj'} = \frac{1}{1 - \tau(S_j, S_{j'})}. \quad (25)$$

Estimating the parameter $\lambda_{jj'}$ by computing pairwise Kendall correlation measures is not mathematically rigorous for triangular norms, but is suitable for computing automatic adapted values for each pair $\lambda_{jj'}; \forall j < j'$.

It is also contemplated for the strength of relationship estimator 42 to use different correlation measures for estimating the relationships between the profiles of different pairs of judges. It is advantageous to have, for each judge j, a distribution of correlation measures which identifies the judge or judges j' which are the most similar with judge j, in order to give more emphasis to their joint measure. Toward this end, either a Bravais-Pearson correlation measure or a Spearman's rank correlation measure can be associated with an adapted link function for computing the parameters $\lambda_{jj'}$.

In the foregoing, various triangular norm functions have been described which are suitable for use as the pairwise conjunction operator T(. . .) 40 in the consensus aggregation function A(i) as set forth in Equation (10). However, substantially any kind of binary conjunction operation that measures the conjunction of two fuzzy sets can also be used as the pairwise conjunction operator T(. . .) 40 in Equation (10). As an example, the prioritized conjunction of Dubois and Prade:

$$T^{DP}(S_j(i), S_{j'}(i)) = \min(S_j(i), \max(S_{j'}(i), 1 - h(S_j, S_{j'}))) \quad (26)$$

can be used as the pairwise conjunction operator T(. . .) 40, where $$h(S_j, S_{j'}) = \sup_i (\min(S_j(i), S_{j'}(i)))$$

is the degree of consistency between two judges.

The fusion apparatus of FIG. 1 for fusing M rankings generated by M judges can be used in various ways. In the following, two illustrative applications are illustrated and described.

Figure 2:
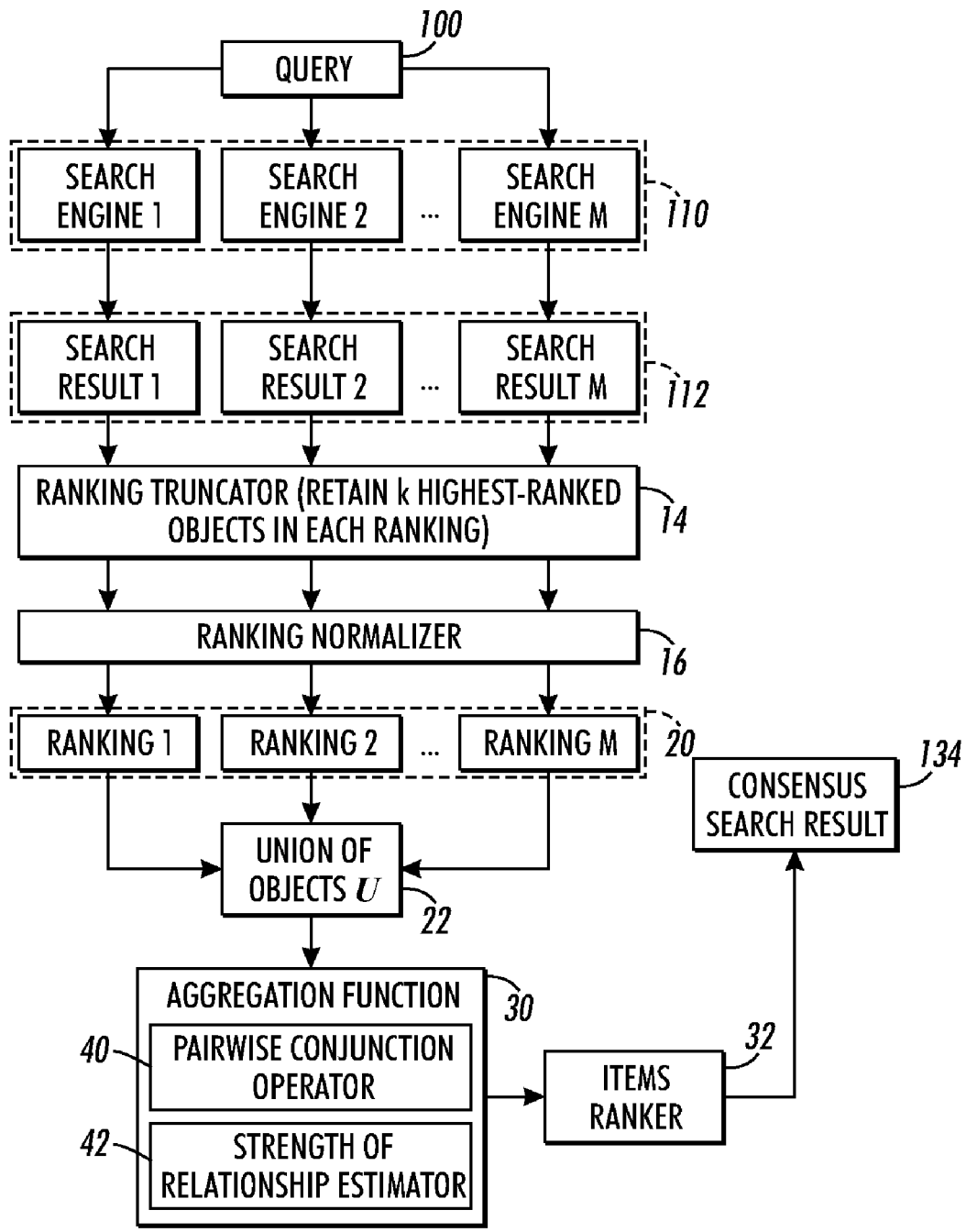
FIG. 2 diagrammatically shows an application of the fusion apparatus of FIG. 1 to generating a consensus search result from search results generated by a query input to M different Internet search engines.

With reference to FIG. 2, an illustrative meta-search engine application is illustrated. In this application, a search query 100 is input to M Internet search engines 110 which serve as the M judges 10 of FIG. 1. The M Internet search engines 110 generate M respective search results 112, which serve as the M raw rankings 12 of FIG. 1. The fusion apparatus 14, 16, 20, 22, 30, 32 operates on the M search results 112 as described with reference to FIG. 1 to generate a consensus search result 134 that corresponds to the aggregation ranking 34 of FIG. 1.

In one suitable configuration, the M Internet search engines 110 are publicly accessible search engines such as Google™, Altavista™, Lycos™, or so forth, and the fusion apparatus forwards the query 100 to each search engine at its universal resource locator (URL) address (for example, http://www-.google.com/ for Google™) using a query string of the form "?<query>" appended to the URL, or using another suitable syntax, to input the query 100 to the search engine. In some embodiments, the fusion apparatus 14, 16, 20, 22, 30, 32 is embodied as an Internet server that is accessed by a client computer using a suitable URL and provides a user interface configured to receive the query 100 from the client computer via the Internet. The Internet server embodying the fusion apparatus 14, 16, 20, 22, 30, 32 then computes the consensus search result 134 and returns the consensus search result 134 to the client computer via the Internet in a suitable format such as HTML.

In other contemplated embodiments, the fusion apparatus 14, 16, 20, 22, 30, 32 may be a plug-in or other component of a web browser executing on a laptop computer, desktop computer, or other computer directly accessed by an end user. The plug-in or other component of the web browser is configured to receive the query 100 from the user, input the query 100 to each of the M Internet search engines 110 over the Internet via the respective URL addresses with a query string of the form "?<query>" appended to each URL, or using another suitable Internet syntax, and receives the M search results 112 from the Internet search engines 110. Thereafter, the fusion apparatus 14, 16, 20, 22, 30, 32 embodied as a plug-in or other component of the web browser computes and displays the consensus search result 134.

Figure 3:
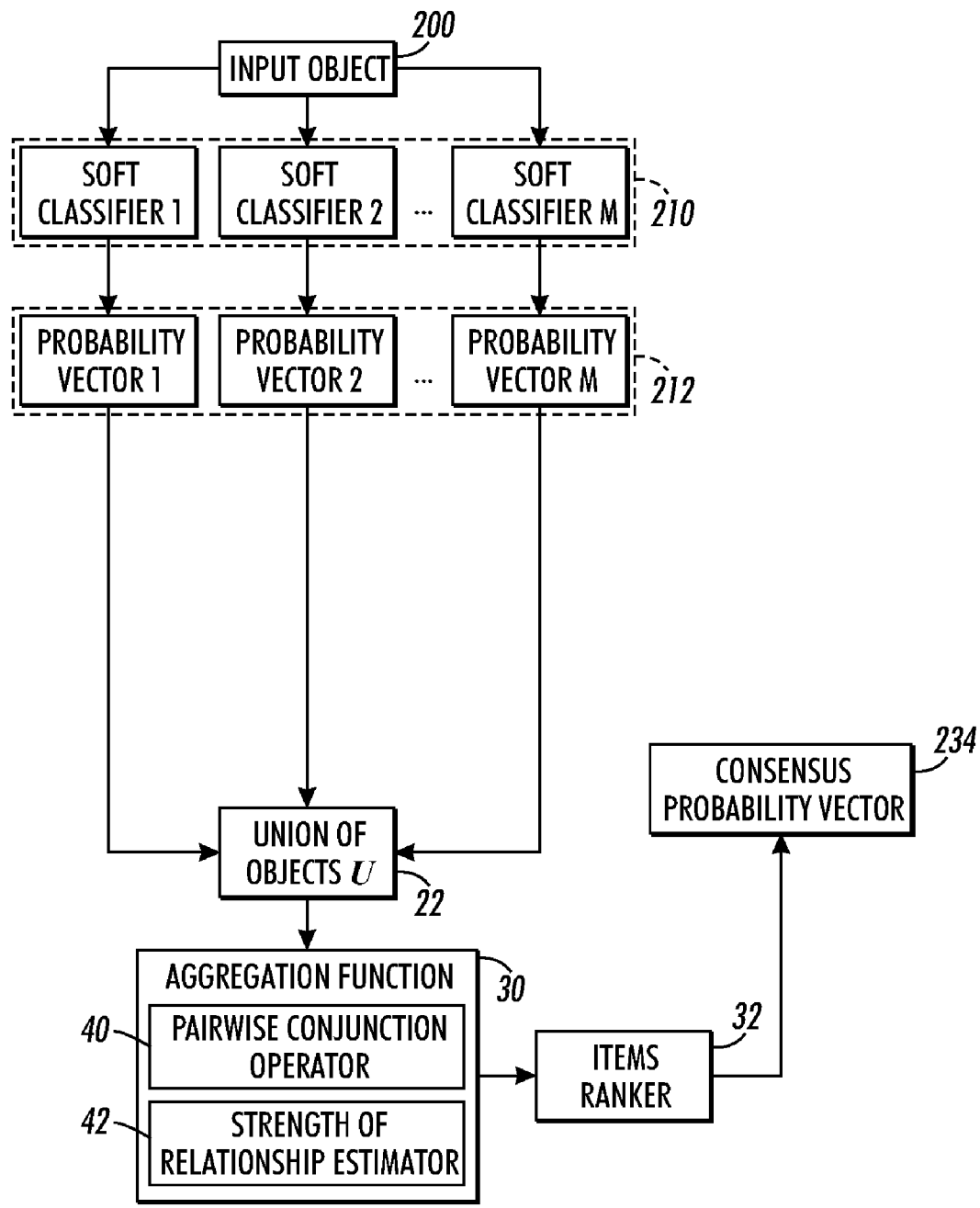
FIG. 3 diagrammatically shows an application of the fusion apparatus of FIG. 1 to generating a consensus probability vector from M probability vectors each having k elements generated for an input object by M different soft classifiers.

With reference to FIG. 3, in a soft classification application example an input object 200 is input to M soft classifiers 210 which in this application serve as the M judges 10 of the fusion apparatus of FIG. 1. The M soft classifiers 210 generate M respective probability vectors 212 corresponding to the M raw rankings 12 of FIG. 1. In this illustrative embodiment, the each of the M soft classifiers 210 are configured to classify the input object 200 respective to classes of a set of k classes, and each of the M soft classifiers 210 is further configured to generate a normalized probability vector in which the k elements of the probability vector are each in the range [0,1] and the sum of the k elements of the probability vector is unity. Accordingly, in this embodiment the truncator 14 and the ranking normalizer 16 are suitably omitted, since each of the M probability vectors 212 corresponding to the M raw rankings 12 of FIG. 1 are inherently of length k and are inherently normalized. The thusly simplified fusion apparatus 22, 30, 32 outputs a consensus probability vector 234 corresponding to the aggregation ranking 34 of FIG. 1.

In one suitable embodiment, the M soft classifiers 210 and the fusion apparatus 22, 30, 32 are all embodied by a single computer that runs software implementing the M soft classifiers 210 and the fusion apparatus 22, 30, 32 and also implementing a user interface that enables the user to identify or input the input object 200 and to perceive the consensus probability vector 234 in a human-perceptible format such as a list of displayed probabilities. In some embodiments, the software further implements hard classification by performing thresholding on the consensus probability vector 234 to assign the input object 200 to a single "most probable" class of the set of k classes. Moreover, it is contemplated for the M soft classifiers 210 and the fusion apparatus 22, 30, 32 to be an automated composite component of larger overall system such that the fusion apparatus 22, 30, 32 does not directly interact with a user. For example, the M soft classifiers 210 and the fusion apparatus 22, 30, 32 may be components of a document storage and retrieval system, the input object may be an input document to be stored, and the consensus probability vector 234 is not displayed but rather is used by the document storage and retrieval system to (i) index or otherwise organize the input document respective to other documents stored in the document storage and retrieval system, and to (ii) retrieve the input document at a later date in response to receipt of a user query criterion that is satisfied by the consensus probability vector 234.

It is to be appreciated that FIGS. 2 and 3 merely illustrate some applications as examples. The fusion apparatus as described with reference to FIG. 1 will find use in any application in which a plurality of judges rank items by order of relevance, such that the different judges produce different rankings from which it is advantageous to generate an aggregate or consensus ranking.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A fusion method for fusing M rankings generated by M judges where M is an integer greater than unity, the fusion method comprising:

computing values of an aggregation function for items in a union of items of the M rankings, the aggregation function including a sum of pairwise conjunctions of ranking values of different judges for an input item, wherein the aggregation function has an output quantitatively equal to A(i) where A(i) is given by:

$$A(i) = \sum_{j=1}^{M} S_j(i) + \sum_{1 \leq j < j' \leq M} T(S_j(i), S_{j'}(i))$$

where the index i indexes the input item in the union of items of the M rankings, $S_j(i)$ denotes the ranking value for input item i generated by a judge indexed by j of the M judges, and T(. . .) denotes a triangular norm;

constructing an aggregation ranking of items in the union of items of the M rankings based on the computed values of the aggregation function; and outputting informational content embodying the aggregation ranking.

2. The fusion method as set forth in claim 1, further comprising:

prior to the computing, truncating the M rankings to include only k highest ranked items of each truncated ranking where k is an integer greater than unity; and normalizing the M truncated rankings.

3. The fusion method as set forth in claim 1, wherein the M judges are M different Internet search engines and the M rankings are M sets of search engine results generated for a query input to the M different Internet search engines, and the outputting of informational content embodying the aggregation ranking comprises:

displaying a consensus Internet search result defined by the aggregation ranking and corresponding to the query.

4. The fusion method as set forth in claim 1, wherein the M judges are M different soft classifiers for classifying an object respective to a set of k classes where k is an integer greater than unity, and the M rankings are M probability vectors each having k elements generated for an input object by the M different soft classifiers, and the outputting of informational content embodying the aggregation ranking comprises:

assigning a classification to the input object based on a consensus probability vector defined by the aggregation ranking; and at least one of displaying and storing the classification.

5. The fusion method as set forth in claim 1, wherein the triangular norm $T(S_j(i), S_{j'}(i))$ is a non-parametric triangular norm selected from a group consisting of:

$\min(S_j(i), S_{j'}(i))$, $(S_j(i) \bullet S_{j'}(i))$ where ● denotes a product, a Lukasiewicz norm $T^L(S_j(i), S_{j'}(i)) = \max(S_j(i) + S_{j'}(i) - 1, 0)$, and a drastic product $$T^D(S_j(i), S_{j'}(i)) = \begin{cases} 0 & \text{if}(S_j(i), S_{j'}(i)) \in [0, 1[^2 \\ \min(S_j(i), S_{j'}(i)) & \text{otherwise} \end{cases}.$$

6. The fusion method as set forth in claim 1, wherein the triangular norm $T(S_j(i), S_{j'}(i))$ is a parametric triangular norm.

7. The fusion method as set forth in claim 6, further comprising:

estimating strengths of relationship for different pairs of ranking values obtained from the M rankings; and adjusting a parameter of the parametric triangular norm for different pairwise conjunctions of ranking values based on the estimated strengths of relationship of the different pairs of ranking values.

8. A fusion apparatus comprising:

a digital processing device configured to perform a fusion method for fusing M rankings generated by M judges where M is an integer greater than unity, the fusion method including:

computing values of an aggregation function for items in a union of items of the M rankings, the aggregation function including a sum of pairwise conjunctions of ranking values of different judges for an input item, wherein the aggregation function has an output quantitatively equal to A(i) where A(i) is given by:

$$A(i) = \sum_{j=1}^{M} S_j(i) + \sum_{1 \leq j < j' \leq M} T(S_j(i), S_{j'}(i))$$

where the index i indexes the input item in the union of items of the M rankings, $S_j(i)$ denotes the ranking value for input item i generated by a judge indexed by j of the M judges, and T(. . .) denotes a triangular norm;

constructing an aggregation ranking of items in the union of items of the M rankings based on the computed values of the aggregation function; and outputting informational content embodying the aggregation ranking.

9. A storage medium storing instructions executable by a digital processing device to perform a fusion method for fusing M rankings generated by M judges where M is an integer greater than unity, the fusion method including (1) computing values of an aggregation function for items in a union of items of the M rankings, the aggregation function including a sum of pairwise conjunctions of ranking values of different judges for an input item, wherein the aggregation function has an output quantitatively equal to A(i) where A(i) is given by:

$$A(i) = \sum_{j=1}^{M} S_j(i) + \sum_{1 \le j < j' \le M} T(S_j(i), S_{j'}(i))$$

where the index $_i$ indexes the input item in the union of items of the M rankings, $S_j(i)$ denotes the ranking value for input item i generated by a judge indexed by j of the M judges, and T(. . .) denotes a triangular norm, (2) constructing an aggregation ranking of items in the union of items of the M rankings based on the computed values of the aggregation function, and (3) outputting informational content embodying the aggregation ranking.

10. The storage medium as set forth in claim 9, wherein the triangular norm $T(S_j(i),S_{j'}(i))$ is a non-parametric triangular norm selected from a group consisting of:

$\min(S_j(i),S_{j'}(i))$, $(S_j(i) \bullet S_{j'}(i))$ where $\bullet$ denotes a product, a Lukasiewicz norm $T^L(S_j(i),S_{j'}(i)) = \max(S_j(i)+S_{j'}(i)-1, 0)$, and a drastic product $$T^D(S_j(i), S_{j'}(i)) = \begin{cases} 0 & \text{if } (S_j(i), S_{j'}(i)) \in [0, 1[^2 \\ \min(S_j(i), S_{j'}(i)) & \text{otherwise} \end{cases}.$$

11. The storage medium as set forth in claim 9, wherein the triangular norm $T(S_j(i),S_{j'}(i))$ is a parametric triangular norm.

12. The storage medium as set forth in claim 9, wherein the triangular norms are selected from a group consisting of:

$$T^M = \min(S_j(i), S_{j'}(i)),$$

$$T^P = (S_j(i) \cdot S_{j'}(i)) \text{ where} \cdot \text{denotes a product,}$$

$$T^L(S_j(i), S_{j'}(i)) = \max(S_j(i) + S_{j'}(i) - 1, 0),$$

$$T^D(S_j(i), S_{j'}(i)) = \begin{cases} 0 & \text{if } (S_j(i), S_{j'}(i)) \in [0, 1[^2 \\ \min(S_j(i), S_{j'}(i)) & \text{otherwise} \end{cases}, \text{ and}$$

a parametric triangular norm incorporating at least one of $T^M, T^P, T^L, T^D$, where index i indexes the input item and $S_j(i)$ denotes the ranking value for input item i generated by a judge indexed by j of the M judges.

13. The storage medium as set forth in claim 9, wherein the stored instructions are further executable to one of (1) acquire the M rankings as M sets of search engine results generated for a query input to M different Internet search engines and (2) acquire the M rankings as M probability vectors each having k elements corresponding to classes of a set of k classes generated for an input object by M different soft classifiers.

14. The storage medium as set forth in claim 9, wherein the M judges are M different Internet search engines and the M rankings are M sets of search engine results generated for a query input to the M different Internet search engines, and the outputting operation (3) comprises:

displaying a consensus Internet search result defined by the aggregation ranking and corresponding to the query.

15. The storage medium as set forth in claim 9, wherein the M judges are M different soft classifiers for classifying an object respective to a set of k classes where k is an integer greater than unity, and the M rankings are M probability vectors each having k elements generated for an input object by the M different soft classifiers, and the outputting operation (3) comprises:

assigning a classification to the input object based on a consensus probability vector defined by the aggregation ranking; and at least one of displaying and storing the classification.

* * * * *